United States Patent
Beygzadeh

(10) Patent No.: US 9,191,917 B2
(45) Date of Patent: Nov. 17, 2015

(54) METHOD AND ARRANGEMENT FOR PAGING IN A WIRELESS COMMUNICATIONS SYSTEM

(75) Inventor: Arash Beygzadeh, Täby (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 327 days.

(21) Appl. No.: 13/203,401

(22) PCT Filed: May 16, 2011

(86) PCT No.: PCT/SE2011/050614
§ 371 (c)(1),
(2), (4) Date: Aug. 25, 2011

(87) PCT Pub. No.: WO2011/162667
PCT Pub. Date: Dec. 29, 2011

(65) Prior Publication Data
US 2011/0310804 A1    Dec. 22, 2011

Related U.S. Application Data

(60) Provisional application No. 61/356,698, filed on Jun. 21, 2010.

(51) Int. Cl.
*H04W 4/00* (2009.01)
*H04W 68/00* (2009.01)
(Continued)

(52) U.S. Cl.
CPC .......... *H04W 68/00* (2013.01); *H04W 28/02* (2013.01); *H04W 76/048* (2013.01)

(58) Field of Classification Search
None
See application file for complete search history.

(56) References Cited

U.S. PATENT DOCUMENTS

2006/0002383 A1*  1/2006  Jeong et al. ............... 370/360
2006/0189331 A1*  8/2006  Lundsjo et al. ........... 455/458

(Continued)

FOREIGN PATENT DOCUMENTS

WO          0189256 A1    11/2001
WO       2008014122 A2     1/2008

OTHER PUBLICATIONS

3rd Generation Partnership Project, Technical Specification Group Services and System Aspects, General Packet Radio Service (GPRS) enhancements for Evolved Universal Terrestrial Radio Access Network (E-UTRAN) access, Sep. 2009, 3GPP TS 23.401 V9.2.0 (Release 9).

(Continued)

*Primary Examiner* — Chirag Shah
*Assistant Examiner* — Amar Persaud
(74) *Attorney, Agent, or Firm* — Coats & Bennett, PLLC

(57) ABSTRACT

A method in an eNodeB, a radio network controller, or a base station controller for handling paging of a first user equipment being in idle mode is provided. The base station is comprised in a communication system. The base station obtains (301) an indication from a mobility management entity or from a serving GPRS support node within the communication system. The indication indicates a type of downlink data to be transmitted to the first user equipment. After the base station has determined (302) a paging policy based on the obtained indication of type, it sends (303) a paging message to the user equipment according to the determined paging policy. The paging message notifies the first user equipment that there is downlink data to be transmitted to the first user equipment.

12 Claims, 5 Drawing Sheets

(51) Int. Cl.
   *H04W 28/02*   (2009.01)
   *H04W 76/04*   (2009.01)

(56) References Cited

U.S. PATENT DOCUMENTS

2007/0077947 A1    4/2007  Rossetti
2009/0286528 A1*  11/2009  Lie et al. .................... 455/422.1
2012/0002608 A1*   1/2012  Vesterinen et al. ............ 370/328
2012/0135701 A1*   5/2012  Zhu et al. .................... 455/404.1

OTHER PUBLICATIONS

3rd Generation Partnership Project, Technical Specification Group Radio Access Network, Evolved Universal Terrestrial Radio Access Network (E-UTRAN), S1 Application Protocol (S1SP), Mar. 2010, 3GPP TS 36.413 V9.2.0 (Release 9).

3rd Generation Partnership Project, Technical Specification Group Radio Access Network, Evolved Universal Terrestrial Radio Access (E-UTRA), User Equipment (UE) procedures in idle mode, Mar. 2010, 3GPP TS 36.304 V9.2.0 (Release 9).

3rd Generation Partnership Project, Technical Specification Group Radio Access Network, Evolved Universal Terrestrial Radio Access (E-UTRA), Radio Resource Control (RRC), Protocol specification, Mar. 2010, 3GPP TS 36.331 V9.2.0 (Release 9).

Telcordia, et al., "Priority for Mobile Terminating Sessions", SA WG2 Temporary Document, 3GPP TSG SA WG2 Meeting #78, 2010-02-22, pp. 1-5, TD S2-101223, 3GPP, San Francisco, US.

3RD Generation Partnership Project, "Priority for Mobile Terminating Sessions." 3GPP TSG WG2 Meeting #78, TD S2-101223, Agenda Item 9.8, Release 10, San Fransisco, USA, Feb. 22-26, 2010, pp. 1-5.

* cited by examiner

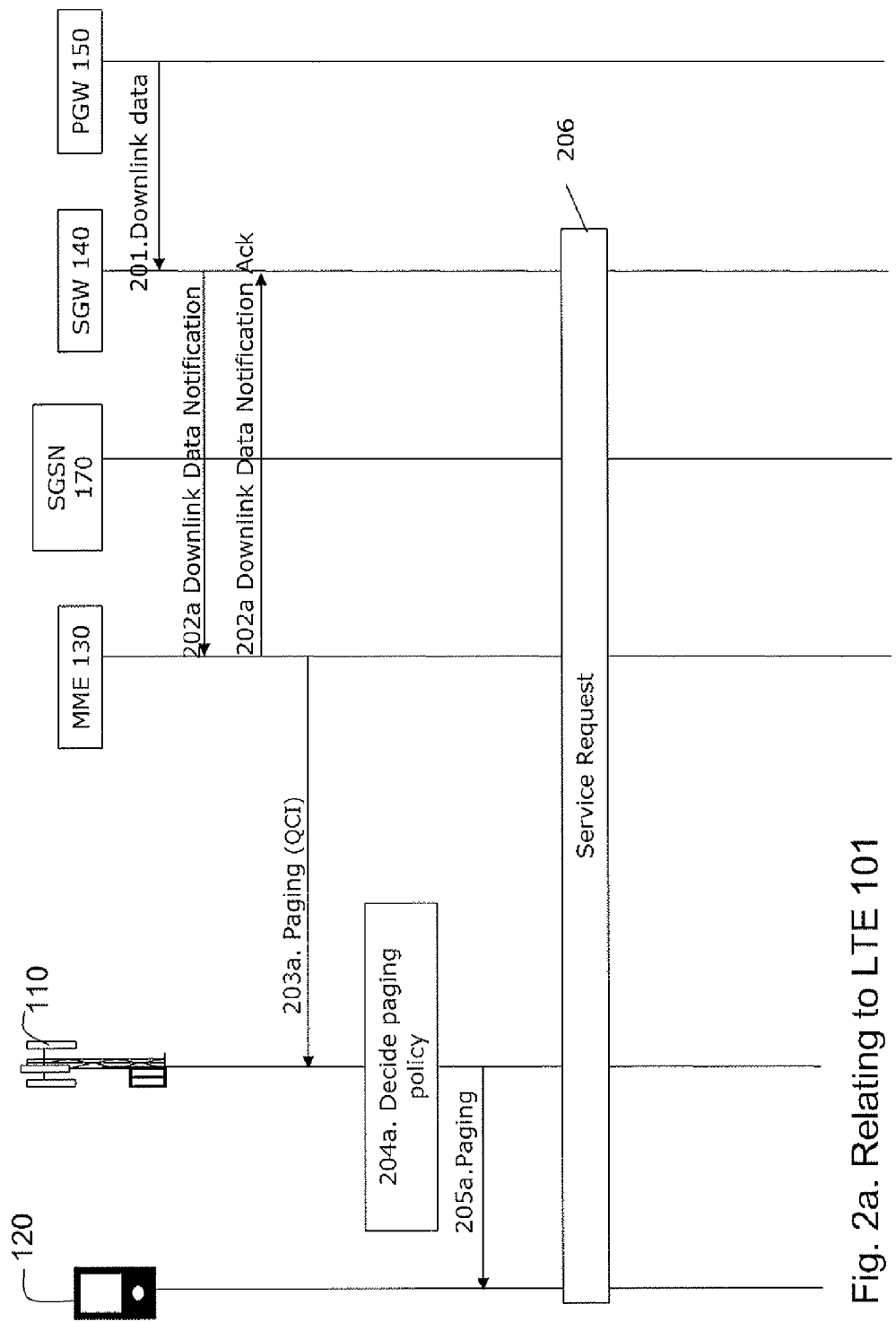
Fig. 2a. Relating to LTE 101

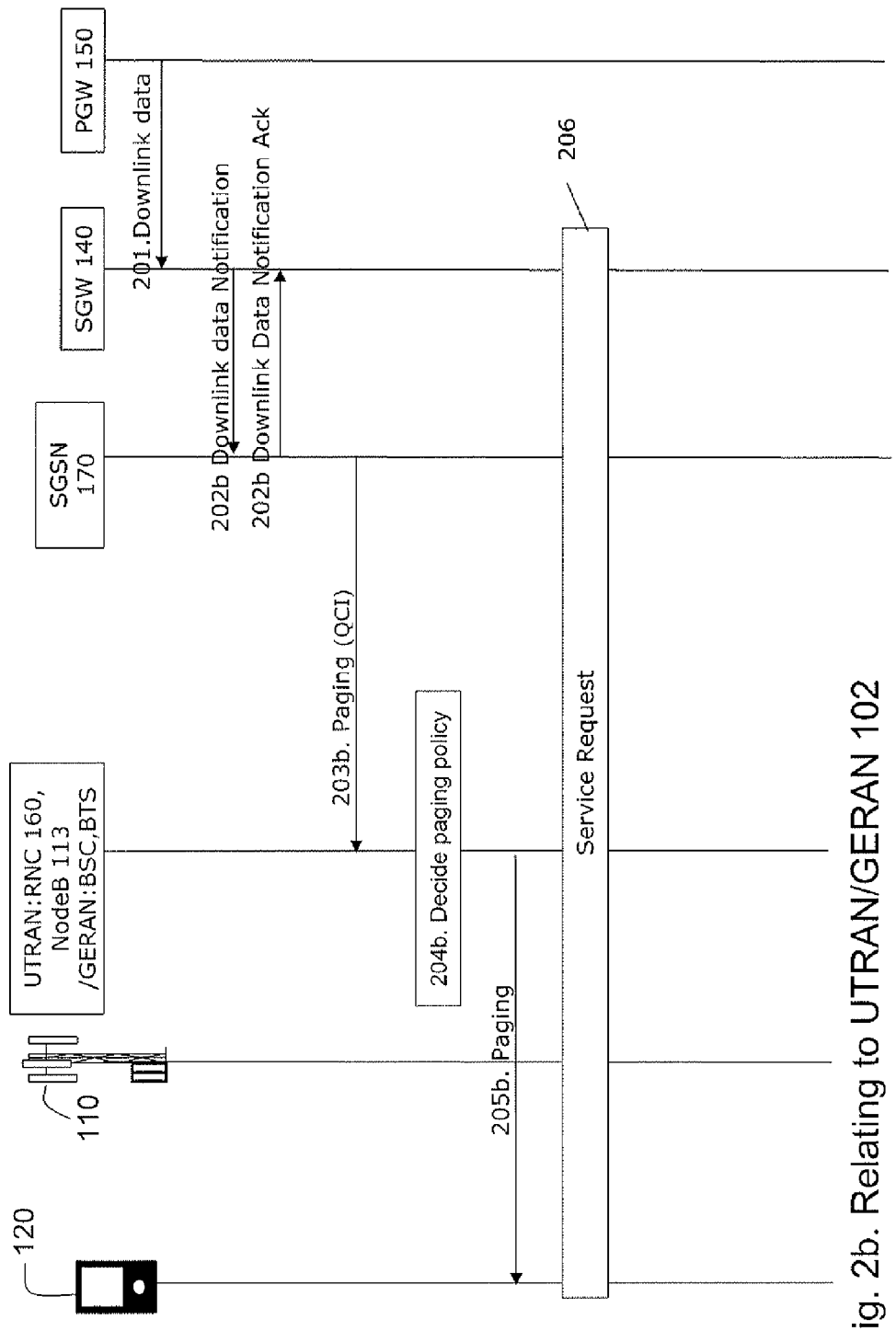
Fig. 2b. Relating to UTRAN/GERAN 102

METHOD AND ARRANGEMENT FOR PAGING IN A WIRELESS COMMUNICATIONS SYSTEM

TECHNICAL FIELD

The present invention relates to a radio network node and a method therein. In particular, it relates to handling a paging to a user equipment.

BACKGROUND

In a typical cellular radio system, also referred to as a wireless communication system, user equipments, also known as mobile terminals and/or wireless terminals communicate via a Radio Access Network (RAN) to one or more core networks. The user equipments may be mobile stations or user equipment units such as mobile telephones also known as "cellular" telephones, and laptops with wireless capability, e.g., mobile terminals, and thus may be, for example, portable, pocket, hand-held, computer-included, or car-mounted mobile devices which communicate voice and/or data with radio access network.

The radio access network covers a geographical area which is divided into cell areas, with each cell area being served by a radio network node referred to as a base station, e.g., a Radio Base Station (RBS), which in some networks is also called "eNB", "eNodeB", "NodeB" or "B node". A cell is a geographical area where radio coverage is provided by the radio base station equipment at a base station site. The base stations communicate over the air interface operating on radio frequencies with the user equipment units within range of the base stations.

In some versions of the radio access network, several base stations are typically connected, e.g., by landlines or microwave, to a radio network node referred to as a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using WCDMA for user equipment units (UEs). The Third Generation Partnership Project (3GPP) has undertaken to evolve further the UTRAN and GSM based radio access network technologies. In the end of 2008 the first release, Release 8, of the 3GPP Long Term Evolution (LTE) standard was finalized and the release 9 is currently going on.

Within the 3GPP specifications for LTE, the Evolved UMTS Terrestrial Radio Access (E-UTRA) describes the Radio Access Technology. Mobile part of LTE is referred to as User Equipment (UE), and the Evolved UMTS Terrestrial Radio Access Network (E-UTRAN) describes the radio access network, referring to the base station part containing the Evolved Node B (eNB) and which is a radio network node. Along with the LTE specifications, 3GPP is working on a complementary project called the System Architecture Evolution (SAE), which defines the split between LTE and a new Evolved Packet Core (EPC). This architecture is a flatter, packet-only core network that will help deliver the higher throughput, lower cost, and lower latency that is the goal of LTE. It is also designed to provide seamless interworking with existing 3GPP and non-3GPP access technologies.

If a Mobility Management Entity (MME) needs to signal with the user equipment that it is in Evolved Packet System (EPS) Connection Management (ECM)-IDLE state, e.g. to perform an MME/Home Subscriber Service (HSS)-initiated detach procedure for the ECM-IDLE mode user equipment, or a Serving GateWay (SGW) receives control signalling, e.g. Create Dedicated Bearer Request or Modify Dedicated Bearer Request, the MME starts network triggered service request procedure.

If Idle mode Signalling Reduction (ISR) is activated, when the SGW receives a Create Dedicated Bearer Request or Modify Bearer Request for a user equipment, and the SGW does not have a downlink S1-U and the Serving General Packet Radio Service (GPRS) Support Node (SGSN) has notified the SGW that the user equipment has moved to Packet mode Mobility Management (PMM)-IDLE or STANDBY state, the SGW buffers signalling messages and triggers MME and SGSN to page the user equipment. S1-U is the communication interface between the MME and SGW. In this case the SGW will be notified about the current Radio Access Technology (RAT) type based on the user equipment triggered service request procedure. The SGW will go on executing the dedicated bearer activation or dedicated bearer modification procedure, i.e. send the corresponding buffered signalling to MME or SGSN which user equipment resides in now and inform the current RAT type to a Packet Data Network Gateway (PGW) if the RAT type has been changed compared to the last reported RAT Type. If dynamic Policy and Charging Control (PCC) is deployed, the current RAT type information shall also be conveyed from the PGW to a Policy and Charging Rules Function (PCRF). If the PCRF response leads to an EPS bearer modification the PGW should initiate a bearer update procedure.

Paging in an LTE network is the process of notifying user equipments in idle mode i.e. so-called RRC_IDLE mode, according to the Radio Resource Control (RRC) protocol, about an incoming data session. In the LTE network, the location of a user equipment in idle mode is known by the network on a Tracking Area (TA) granularity.

The Mobility Management Entity (MME) in the EPC initiates the paging procedure by sending a Paging message to all the eNBs with at least a cell belonging to one or several TAs, in a so called Tracking Area List within which the user equipment is registered. So for each incoming "call" towards an Idle user equipment, pagings will be sent out in ALL cells belonging to the TAs in the in the TA list If a user equipment reselects a cell belonging to a new TA where the user equipment is not registered, the user equipment initiates a TA update to the EPC in order to register and it receives a new list of TAs where it is registered.

The Air Interface

Radio resources in E-UTRA are in the time domain defined by Radio Frames and Subframes. Each Radio Frame is 10 ms and consists of 10 Subframes each with a duration of 1 ms.

The user equipment may use Discontinuous Reception (DRX) in idle mode. DRX is an essential feature in cellular systems to allow user equipment battery saving. When the user equipment is in its recurring so called DRX periods it is not listening to the eNB and when it is in its non-DRX periods it is "awake" or listening to the eNB.

In the LTE idle state the user equipment listens to the network (e.g. by means of paging information) only at non- DRX instants and performs autonomous cell reselection. In order to receive data the user equipment needs to enter into LTE active state.

Hence paging a user equipment must occur during user equipment's non-DRX periods. The broadcast of Paging messages by eNB is done only in certain sub-frames, so called Paging Occasions (PO), of certain Radio Frames, so called Paging Frames (PFs).

According to 3GPP, Configuration of PFs and POs is done in the eNB by the 2 parameters defaultPagingCycle and nB. These two parameters are used by eNB and the user equipment in calculations of the occurrences of POs in the time domain.

Where the default paging cycle is the length of the cycle for PO recurrence for user equipments in time. I.e. the defaultPagingCycle=320 ms means that each user equipment should wake up from its DRX and listen for Paging each 320 ms. nB affects number of available POs per PF. Both parameters affect position of the PFs and POs in time domain used by the user equipment.

The defaultPagingCycle and nB are broadcasted in System Information, so that the user equipments adapt their DRX behavior according to eNB configuration. System Information is broadcast by eNBs in all cells and contains necessary information about the Radio Network's properties and configuration in order for the user equipment to be able to connect and communicate with the radio access network.

Upon reception of paging the user equipment initiates a Service Request to the network, which is expected by the MME in EPC. This is done in order to inform the network about where the user equipment is located and to start up the establishment of a connection for receiving the incoming data.

Paging traffic is for many operators a concern and subject to "tuning" and "optimization" in terms of Tracking Area planning. A high intensity in Paging load always means lower User Data rates in LTE, since paging traffic and data traffic share the same physical radio resources. Thus today's inefficient paging systems reduces the performance of the network.

SUMMARY

It is therefore an object of embodiments of the present invention to provide a mechanism for paging that is more efficient.

According to a first aspect of the invention, the object is achieved by a method in a radio network node in a communication system, for handling paging to a first user equipment. After receiving a paging message from a network node, the radio network node obtains an indication from said paging message. The indication indicates the priority of said paging message. The radio network node then performs paging of said first user equipment taking into account the obtained priority indication.

According to a second aspect of the invention, the object is achieved by a radio network node in a communication system, for handling paging to a first user equipment. The radio network node comprises an obtaining unit configured to receive a paging message from a network node. The radio network node further comprises a determining unit configured to obtain an indication from said paging message, wherein said indication indicates the priority of said paging message. The radio network node further comprises a transmitter configured to perform paging of said first user equipment taking into account the obtained priority indication.

Since the radio network node obtains a priority indication it can perform paging to the user equipment according to the obtained priority indication. This makes it possible for the radio network node to make intelligent decisions for applying different policies for each individual incoming paging message and in this way help the radio network node especially during peak traffic or congestion to prioritize transmissions.

BRIEF DESCRIPTION OF THE DRAWINGS

The invention is described in more detail with reference to attached drawings illustrating exemplary embodiments of the invention and in which:

FIG. 2a is a combined signalling scheme and flowchart illustrating embodiments of a method.

FIG. 2b is a combined signalling scheme and flowchart illustrating embodiments of a method.

DETAILED DESCRIPTION

Embodiments herein may be exemplified in the following non-limiting description of embodiments of the invention.

Figure 1:
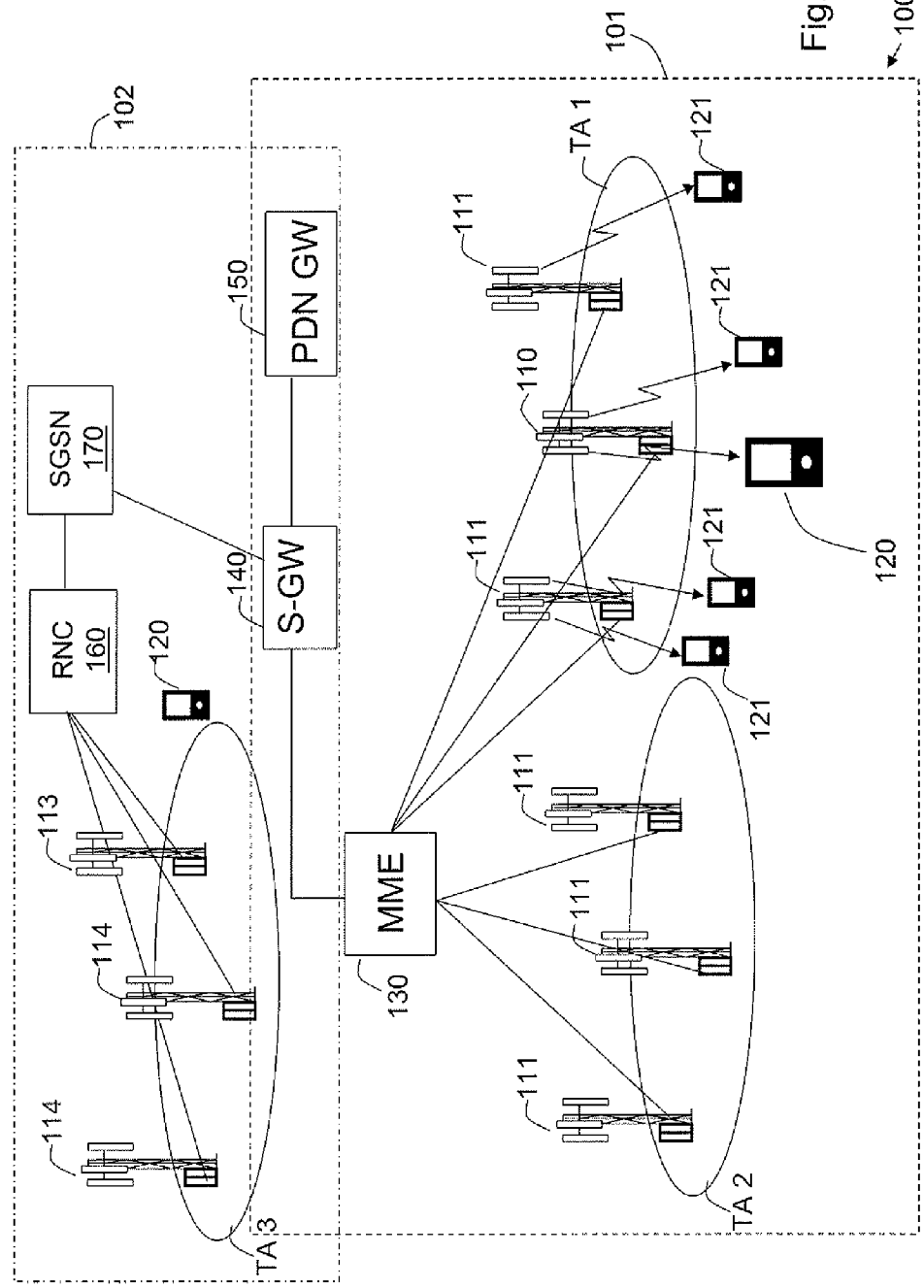
FIG. 1 is a schematic block diagram illustrating embodiments of a communications system 100.

FIG. 1 depicts a communications system 100 in which embodiments herein is implemented. The communications system 100 may be an LTE communications system shown as a dashed line 101, or a WCDMA or a GSM communications system shown as a dashed and dotted line 102, or any other wireless communications system.

Referring to LTE 101, the communications system 100 comprises a base station 110 comprised in a first tracking area TA1. The base station 110 is a communication node within the communications system 100. The communications system 100 further comprises other base stations 111, where in FIG. 1, two are these are also comprised in tracking area TA1, and three other base stations are comprised in a second tracking area TA2. The base station 110 and the other base stations 111 are radio network nodes also referred to as radio access nodes, such as an eNodeB, eNB or any other network unit capable to communicate with user equipments over a radio carrier.

Referring to WCDMA and GSM 102, the communications system 100 comprises a base station 113 comprised in a third tracking area TA3. The base station 113 is a communication node within the communications system 100. The communications system 100 further comprises other base stations 114, where in FIG. 1, these are also comprised in tracking area TA3. The base station 113 and the other base stations 114 are radio base stations such as an NB, NodeB, a Base Tranceiver Station (BTS) or any other network unit capable to communicate with user equipments over a radio carrier.

A first user equipment 120 being served by base station 110 and being registered to TA1, is present. Other user equipments 121 also being registered to TA1 are also present. To explain different scenarios, the first user equipment 120 is shown in two places in FIG. 1, it is also shown as being served by the base station 113. The first user equipment 120 is also simply referred to as the user equipment 120, and the other user equipments 121 are also referred to as the second user equipments 121 in this document. The user equipment 120 and the other user equipments 121 capable of communicating with the base stations over an air interface. The user equipment 120 may be a terminal, e.g. a mobile terminal or a wireless terminal, a mobile phone, a computer such as e.g. a laptop, Personal Digital Assistants (PDA), or any other radio network units capable to communicate with a base station over an air interface. The user equipment 120 and the other user equipments 121 in this example are in idle mode.

Referring to LTE 101, the base station 110 and the other base stations 111 are connected to a mobility management entity 130 referred to as MME in FIG. 1. The mobility management entity 130 is not a radio network node, but a core network node. The mobility management entity 130 in turn is connected to a serving gateway 140 referred to S-GW in FIG. 1. The serving gateway 140 is in turn connected to the Packet Data Network (PDN) Gateway (PGW) 150. The roles of the mobility management entity 130, serving gateway 140 and the PDN Gateway 150 will be clear in discussions below.

Referring to WCDMA and GSM 102, the base station 113 and the other base stations 114 are connected to a radio network controller 160 referred to as RNC in FIG. 1. The radio network controller 160 is a radio network node which may be a base station controller referred to as BSC in case of GSM. The radio network controller 160 in turn is connected to a serving GPRS support node 170 is referred to as SGSN in FIG. 1. (GPRS=General Packet Radio Services) The serving GPRS support node 170 is connected to the serving gateway 140.

The roles of the mobility management entity 130, serving gateway 140, the PDN Gateway 150, the radio network controller 160 and the serving GPRS support node 170 will be clear in discussions below.

UTRAN comprises two nodes, RNC and NodeB. GSM EDGE Radio Access Network (GERAN) comprises BSC and Base Transceiver Station (BTS). In E-UTRAN there is only one node, eNodeB, that in terms of functionality corresponds to RNC and NodeB, or BSC and BTS. Therefore the term radio network node 110, 160, 113, will be used in this document to represent eNodeB in case of E-UTRAN, to represent RNC or NodeB in case of UTRAN, and to represent BSC or BTS, in case of GERAN.

All base stations in TA1, i.e. base station 110 and base stations 111, will send Paging in all cells belonging to TA1 in order to reach user equipment 120 registered in TA1. Alternatively all base stations in TA3 will send Paging in all cells belonging to TA3 in order to reach user equipment 120, when being present in TA3.

The method of the present solution is performed in the radio network node 110, 113, 160.

Embodiments herein allow the radio network node 110, 113, 160 to be able to differentiate and prioritize between different incoming paging messages based on the types of the services triggering the paging messages. This is done by providing the radio network node 110, 113, 160 with sufficient information about the services triggering the paging messages, e.g. Quality of Service Class Indicator (QCI). The radio network node 110 may then classify different paging messages and apply different policies for internally handling, prioritization and broadcasting them resulting in a decreased total paging transmission traffic.

Embodiments herein also allow for adapting e.g. intensity of, and strategy for paging retransmissions from the mobility management entity 130, to type and priority of the service triggering the paging. For example, paging messages triggered by an incoming voice or video call may have higher priority than paging messages triggered by an incoming invitation to a chat session or an e-mail push. So by e.g. using lower paging message transmission intensity for lower prioritized services the total paging message retransmission traffic may be decreased.

As part of the invention, a problem will first be identified and discussed. The current standard and way of paging does not provide a base station with any means for differentiating and prioritizing incoming paging messages. All paging messages have the same priority in relation to each other and also same priority in relation to different types of user data sharing the same physical resources i.e. Physical Downlink Shared Channel (PDSCH). Hence for example in a highly loaded/congested cell the base station has to handle all incoming paging messages in the same manner no matter which services have triggered them, i.e. either queue them in the base station waiting for the next paging occasion or discard them. No intelligent filtering of paging messages is possible, even though different services in the communication system have different requirements on service access latency. I.e. an incoming voice call to a user equipment has a higher requirement on call setup time than an incoming e-mail or Machine-to-Machine (M2M) application. Further example in a highly loaded/congested cell, all paging messages have the same priority in relation to user data which shares the same resources on the physical channel as used for the paging data. In a scenario of high user data load in the cell and high intensity of paging messages there is no possibility to prioritize user data over paging messages e.g. triggered by low priority M2M applications or an invitation to an Instant Messaging session, such as a chat session. High intensity in Paging load although from low priority applications always means lower User Data rates.

Today there is neither any differentiation of the paging message retransmission intensity based on the type of service in downlink data traffic triggering the sending of paging messages in the EPC. So for all kinds of incoming downlink data the intensity of the retransmission of the paging messages is the same.

Some embodiments will now be described more in detail. Embodiments for handling a paging message are depicted in the combined signalling scheme and flowchart in FIG. 2a and FIG. 2b. FIG. 2a relates to LTE 101 and FIG. 2b relates to UTRAN/GERAN 102. The method is performed in the radio network node 110, 113, 160 but also other nodes and their actions are depicted in FIGS. 2a and 2b for better understanding the present solution. As mentioned above these embodiments allow the radio network node 110, 113, 160 to be able to differentiate and prioritize between different incoming paging messages based on the types of the services triggering the paging messages. The user equipment 120 is in idle mode. The method depicted in FIG. 2a relating to LTE, comprises the following actions:

Action 201

This Action is the same in FIGS. 2a and 2b. The SGW 140 receives a downlink data packet for the user equipment 120, e.g. from PGW 150. When the SGW 140 receives a downlink data packet for the user equipment 120 known as not user plane connected, i.e. there are no E-UTRAN Radio Access Bearers (E-RAB) established between the SGW 140 and the user equipment 120, the SGW context data indicating no downlink user plane Tunnel Endpoint Identifier (TEID), it buffers the downlink data packet and identifies which MME 130 or SGSN 170 is serving that user equipment 120.

Action 202a Relating to LTE

The SGW 140 sends a Downlink Data Notification message, comprising e.g. QCI, to the MME 130 in action 202a, for which it has control plane connectivity for the given user equipment 120. The MME 130 in action 202a responds to the S-GW 140, also referred to as SGW 140, with a Downlink Data Notification Acknowledgement (Ack) message. If the SGW 140 receives additional downlink data packets for this user equipment 120, the SGW 140 buffers these downlink data packets and the SGW 140 does not send a new Downlink Data Notification.

Action 203a Relating to LTE

If the user equipment 120, also referred to as UE 120, is registered in the MME 130, the MME 130 sends a Paging message to each eNodeB belonging to the tracking area(s) in which the UE 120 is registered. The radio network node, in this embodiment the base station 110, obtains an indication from the MME 130. The indication indicates a type of downlink data to be transmitted to the first user equipment 120. The indicated type of downlink data to be transmitted to the first user equipment 120 may be represented by a quality of service requirement of said downlink data to be transmitted to the first user equipment 120. The indication is obtained from the MME 130 in the paging message.

The paging message extend for the message protocol between the MME and eNodeB, i.e. the base station 110, S1 Application Part, may be required. Therefore an Information Element (IE) with proprietary configuration may be introduced or an extension to the existing IE related to Paging may be added.

Action 204a Relating to LTE

In these LTE related embodiments the radio network node is a base station 110, i.e. an eNodeB.

If the base station 110 receives the Paging message it determines a paging policy based on the obtained indication of type of downlink data. In this way the base station 110 may classify different paging messages and apply different policies for internally handling, prioritization and broadcasting them resulting in a decreased total paging transmission traffic. The paging comprises the following actions, whereof some actions are related to the present solution.

For example, the base station 110 may use a QCI mapping table to find out which paging policy to use. The policies are defined and or configured by the operator.

Action 205a Relating to LTE

The base station 110 sends one or more paging messages to the user equipment 120 according to the determined a paging policy.

Action 206

This Action is the same in FIGS. 2a and 2b. Upon reception of the paging message, the user equipment 120 initiates the user equipment triggered Service Request procedure.

Upon reception of a paging message in UTRAN or GERAN access, the user equipment 120 responds in respective access and the SGSN 170 shall notify the SGW 140.

The MME 130 and/or SGSN 170 may supervise the paging procedure with a timer. If the MME 130 and/or SGSN 170 receive no response from the user equipment 120 to the paging message, it may repeat the paging. The repetition strategy is operator dependent.

If the MME 130 and/or SGSN 170 receive no response from the user equipment 120 after this paging repetition procedure, it shall use the Downlink Data Notification Reject message to notify the SGW 140 about the paging failure. In that case, if Idle Mode Signaling Reduction (ISR) is not activated, the SGW 140 deletes the buffered packet(s). If ISR is activated and the SGW receives paging failure from both SGSN 170 and MME 130, the SGW 140 deletes the buffered packet(s) or rejects the control signalling which triggers the Service Request procedure.

The method depicted in FIG. 2b relating to UTRAN/GERAN comprises the following actions:

Action 201

This Action is the same in FIGS. 2a and 2b. The SGW 140 receives a downlink data packet for the user equipment 120. When the SGW 140 receives a downlink data packet for the user equipment 120 known as not user plane connected, i.e. there are no E-UTRAN Radio Access Bearers (E-RAB) established between the SGW 140 and the user equipment 120, the SGW context data indicating no downlink user plane Tunnel Endpoint Identifier (TEID), it buffers the downlink data packet and identifies which MME 130 or SGSN 170 is serving that user equipment 120.

Action 202b relating to UTRAN/GERAN

The SGW 140 sends a Downlink Data Notification message, comprising e.g. QCI, to the SGSN 170 nodes in action 202b for which it has control plane connectivity for the given user equipment 120. The SGSN 170 in action 202b responds to the S-GW 140, also referred to as SGW 140, with a Downlink Data Notification Acknowledgement (Ack) message. If the SGW 140 receives additional downlink data packets for this user equipment 120, the SGW 140 buffers these downlink data packets and the S-GW 140 does not send a new Downlink Data Notification.

Action 203b Relating to UTRAN/GERAN

If the UE 120 is registered in the SGSN 170, the SGSN 170 sends paging messages to RNC 160 or BSS. BSS is Radio Access Network in GSM i.e BTS+BSC. The radio network node which in these embodiments is the RNC 160 or the BSS, obtains an indication from the SGSN 170. The indication indicates a type of downlink data to be transmitted to the first user equipment 120. The indicated type of downlink data to be transmitted to the first user equipment 120 may be represented by proprietary configuration or quality of service requirement of said downlink data to be transmitted to the first user equipment 120.

Extend for the paging message the message protocol between SGSN and RNC and the message protocol between RNC and NodeB described in 3GPP may be required. Therefore an Information Element (IE) with proprietary configuration or quality of service requirement may be introduced or an extension to the existing IE related to Paging may be added.

Action 204b Relating to UTRAN/GERAN

In these UTRAN/GERAN related embodiments the radio network node is any of RNC/BSS/BSC. If RNC/BSS/BSC nodes 160, 113 receive paging messages from the SGSN 170 the user equipment 120 is paged by the RNC/BSS/BSC nodes 160, 113. In those cases the paging policy is decided similar to Action 204a, but either in UTRAN, i.e. RNC (Radio Network Controler) and NodeB or in GERAN, i.e. BSC (Base Station Controller) and BTS (Base Transceiver Station).

Action 205b Relating to UTRAN/GERAN

The RNC 160/NodeB 113 or BSC/BTS sends one or more paging messages to the user equipment 120 according to the determined paging policy.

Action 206

This Action is the same in FIGS. 2a and 2b. Upon reception of paging message, the user equipment 120 initiates a service request procedure.

Upon reception of paging message in UTRAN or GERAN access, the user equipment 120 responds in respective access and the SGSN 170 shall notify the SGW 140.

The MME 130 and/or SGSN 170 supervise the paging procedure with a timer. If the MME 130 and/or SGSN 170 receive no response from the user equipment 120 to the Paging Request message, it may repeat the paging. The repetition strategy is operator dependent.

If the MME 130 and/or SGSN 170 receive no response from the user equipment 120 after this paging repetition procedure, it shall use the Downlink Data Notification Reject message to notify the SGW 140 about the paging failure. In that case, if ISR is not activated, the SGW 140 deletes the buffered packet(s). If ISR is activated and the SGW receives paging failure from both SGSN and MME, the SGW deletes the buffered packet(s) or rejects the control signalling which triggers the Service Request procedure.

The method performed in the radio network node 110, 113, 160 for handling paging to a first user equipment 120 which may be in idle mode, according to present solution will now be described with reference to a flowchart depicted in FIG. 3. As mentioned above the radio network node 110, 113, 160 is comprised in the communication system 100. The radio network node 110, 113, 160 may be the base station 110 such as an eNodeB, a base transceiver station, a radio network controller 160 or a base station controller.

Action 301

The radio network node 110, 113, 160 receives a paging message from a network node which may be performed by obtaining it from e.g. the mobility management entity 130, the serving GPRS support node 170 or the radio network controller 160 within the communication system 100.

Action 302

The radio network node 110, 113, 160 obtains an indication from said paging message, wherein said indication indicates the priority of said paging message.

This action may comprise determining a paging policy based on the obtained indication of type of downlink data. In some embodiments the paging policy is the indicated priority of said paging message.

The indication may indicate a type of downlink data to be transmitted to the first user equipment 120.

The indicated type of downlink data to be transmitted to the first user equipment 120 may be represented by a quality of service requirement of said downlink data to be transmitted to the first user equipment 120.

The indication may be represented by a Quality of Service Class Indicator referred to as QCI, or a service type parameter indicating for example if the incoming session is a voice call, video session, push-email, invitation to a instant messaging session or instant messaging presence status etc.

In some embodiments the radio network node 110, 113, 160 comprises a table of different types and different paging policies, in which table each type is associated to a respective specific paging policy. In these embodiments the step is performed by using the table for mapping the indicated type to find out which paging policy to be determined to use.

Action 303

The radio network node 110, 113, 160 performs paging of the first user equipment 120 taking into account the obtained priority indication.

In some embodiments this action comprises sending a paging message to the user equipment 120 or to a NodeB 113 according to the determined paging policy. The paging message notifies the first user equipment 120 that there is downlink data to be transmitted to the first user equipment 120. This action is similar to Action 206 described above.

In some embodiments further indications are obtained from the mobility management entity 130 or from a serving GPRS support node 170. These respective further indications each indicates a type of downlink data to be transmitted to one or more second user equipments 121. In these embodiments a respective paging policy has been determined based on each of the obtained further indications of type. In these embodiments this action of sending a paging message to the first user equipment 120 according to the determined paging policy, is prioritized towards sending paging messages to the one or more second user equipments 121 taking into consideration the different determined paging policies for the data to be sent to the one or more second user equipments 121.

In the embodiments comprising the paging policy list, the paging policy list may be prioritized such that a lower paging transmission intensity shall be decided to be used for lower quality of service requirements.

The method performed in the radio network node when the radio network node is a radio network controller 160 for handling paging of a first user equipment 120 being in idle mode, according to present solution will now be described with reference to a flowchart depicted in FIG. 4. As mentioned above the radio network controller 160 is comprised in the communication system 100.

Action 401

The radio network controller 160 obtains an indication from the serving GPRS support node 170 within the communication system 100. The indication indicates a type of downlink data to be transmitted to the first user equipment 120. This action is similar to Action 203 *b* described above.

The indicated type of downlink data to be transmitted to the first user equipment 120 may be represented by a quality of service requirement of said downlink data to be transmitted to the first user equipment 120.

The obtained indication may be represented by a Quality of Service Class Indicator referred to as QCI, or a service type parameter indicating for example if the incoming session is a voice call, video session, push-email, invitation to a instant messaging session or instant messaging presence status etc.

Action 402

The radio network controller 160 determines a paging policy based on the obtained indication of type downlink data. This action is similar to Action 205 described above.

In some embodiments the radio network controller 160 comprises a table of different types and different paging policies, in which table each type is associated to a respective specific paging policy. In these embodiments the step is performed by using the table for mapping the indicated type to find out which paging policy to be determined to use.

Action 403

The radio network controller 160 sends a paging message to the NodeB 113 according to the determined paging policy. The paging message notifies the first user equipment 120 through the NodeB 113 that there is downlink data to be transmitted to the first user equipment 120. This action is similar to Action 206 described above.

In some embodiments further indications are obtained from a serving GPRS support node 170. These respective further indications each indicates a type of downlink data to be transmitted to one or more second user equipments 121. In these embodiments a respective paging policy has been determined based on each of the obtained further indications of type. In these embodiments this action of sending 206 *a* paging message to the first user equipment 120 through NodeB 113 according to the determined paging policy, is prioritized towards sending paging messages to the one or more second user equipments 121 taking into consideration the different determined paging policies for the data to be sent to the one or more second user equipments 121.

In the embodiments comprising the paging policy list, the paging policy list may be prioritized such that a lower paging transmission intensity shall be decided to be used for lower quality of service requirements.

Figure 5:
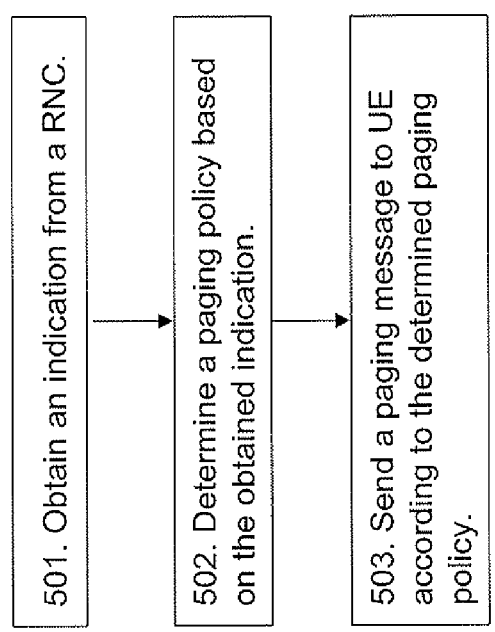
FIG. 5 is a flowchart depicting embodiments of a method.

The method performed in the radio network node when being a NodeB 113 for handling paging of a first user equipment 120 being in idle mode, according to present solution will now be described with reference to a flowchart depicted in FIG. 5. As mentioned above the NodeB 113 is comprised in the communication system 100.

Action 501

The NodeB 113 obtains an indication from a radio network controller 160 within the communication system 100. The indication indicates a type of downlink data to be transmitted to the first user equipment 120. This action is similar to Action 203*a* and 203*b* described above.

The indicated type of downlink data to be transmitted to the first user equipment 120 may be represented by a quality of service requirement of said downlink data to be transmitted to the first user equipment 120.

The obtained indication may be represented by a Quality of Service Class Indicator referred to as QCI, or a service type parameter indicating for example if the incoming session is a voice call, video session, push-email, invitation to a instant messaging session or instant messaging presence status etc.

Action 502

The NodeB 113 determines a paging policy based on the obtained indication of type. This action is similar to Action 205 described above.

In some embodiments the NodeB 113 comprises a table of different types and different paging policies, in which table each type is associated to a respective specific paging policy. In these embodiments the step is performed by using the table for mapping the indicated type downlink data to find out which paging policy to be determined to use.

Action 503

The NodeB 113 sends a paging message to the user equipment 120 according to the determined paging policy. The paging message notifies the first user equipment 120 that there is downlink data to be transmitted to the first user equipment 120. This action is similar to Action 206 described above.

In some embodiments further indications are obtained from the radio network controller 160. These respective further indications each indicates a type of downlink data to be transmitted to one or more second user equipments 121. In these embodiments a respective paging policy has been determined based on each of the obtained further indications of type. In these embodiments this action of sending 206 a paging message to the first user equipment 120 according to the determined paging policy, is prioritized towards sending paging messages to the one or more second user equipments 121 taking into consideration the different determined paging policies for the data to be sent to the one or more second user equipments 121.

In the embodiments comprising the paging policy list, the paging policy list may be prioritized such that a lower paging transmission intensity shall be decided to be used for lower quality of service requirements.

Figure 6:
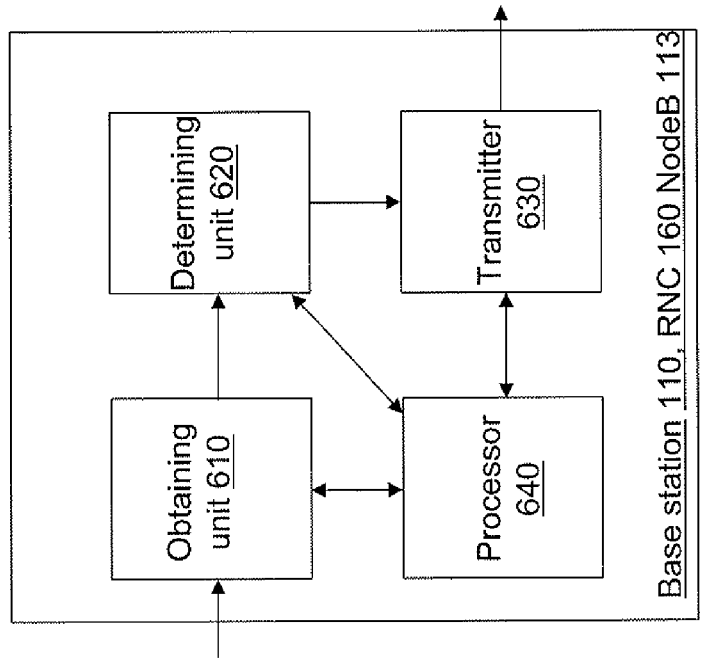
FIG. 6 is a schematic block diagram illustrating embodiments of a radio network node.

To perform the method steps above for handling paging of a first user equipment 120 which may be in idle mode, the radio network node 110, 113, 160 comprises an arrangement depicted in FIG. 6. As mentioned above the radio network node 110, 113, 160 is comprised in a communication system 100. The radio network node 110, 113, 160 may be the base station 110 such as an eNodeB, the radio network controller 160, a base station controller, or a NodeB 113.

The radio network node 110, 113, 160 comprises an obtaining unit 610 configured to receive a paging message from a network node. The network node may be a mobility management entity 130, a serving GPRS support node 170 or a radio network controller 160 within the communication system 100.

The radio network node 110, 113, 160 further comprises a determining unit 620 configured to obtain an indication from said paging message. The indication indicates the priority of said paging message.

In some embodiments the indication indicates a type of downlink data to be transmitted to the first user equipment 120.

The determining unit 620 may further be configured to determine a paging policy based on the obtained indication of type of downlink data, which paging policy is the indicated priority of said paging message.

In some embodiments, the radio network node 110, 113, 160 comprises a table of different types and different paging policies. In this table each type is associated to a respective specific paging policy. In these embodiments the determining unit 620 is further configured to determine the paging policy by using the table for mapping the indicated type to find out which paging policy to be determined to use.

In some embodiments, the determining unit 620 is further configured determine a respective paging policy based on each of the obtained further indications of type.

In some embodiments a paging policy list is prioritized such that a lower paging transmission intensity shall be decided to be used for lower quality of service requirements.

In some embodiments, the obtaining unit 610 is further configured to obtain further indications from the mobility management entity 130, which respective further indications each indicates a type of downlink data to be transmitted to one or more second user equipments 121.

The indicated type of downlink data to be transmitted to the first user equipment 120 may be represented by a quality of service requirement of said downlink data to be transmitted to the first user equipment 120.

The obtained indication may be represented by a service type parameter or a Quality of Service Class Indicator referred to as QCI.

The radio network node 110, 113, 160 further comprises a transmitter 630 configured to perform paging of the first user equipment 120 taking into account the obtained priority indication.

The transmitter 430 may further be configured to perform paging by sending a paging message to the user equipment 120 or to a NodeB 113 according to the determined paging policy. The paging message notifies the first user equipment 120 that there is downlink data to be transmitted to the first user equipment 120.

In some embodiments the transmitter 630 is further configured to send the paging message to the first user equipment 120 according to the determined paging policy, being prioritized towards sending paging messages to the one or more second user equipments 121 taking into consideration the different determined paging policies for the data to be sent to the one or more second user equipments 121.

Figures 3, 4:
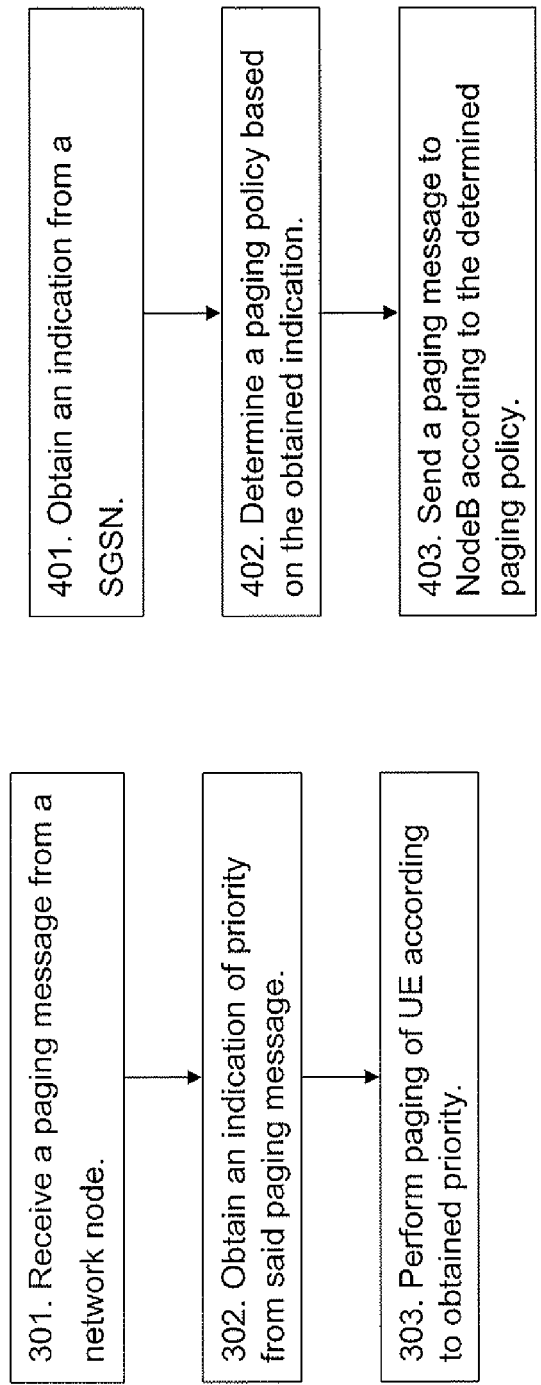
FIG. 3 is a flowchart depicting embodiments of a method.
FIG. 4 is a flowchart depicting embodiments of a method.

The present mechanism for handling paging of a first user equipment 120 being in idle mode, may be implemented through one or more processors, such as a processor 640 in the radio network node 110, 113, 160 depicted in FIG. 4, together with computer program code for performing the functions of the present solution. The program code mentioned above may also be provided as a computer program product, for instance in the form of a data carrier carrying computer program code for performing the present solution when being loaded into the radio network node 110, 113, 160. One such carrier may be in the form of a CD ROM disc. It is however feasible with other data carriers such as a memory stick. The computer program code may furthermore be provided as pure program code on a server and downloaded to the radio network node 110, 113, 160.

An advantage with the present solution is that the radio network node 110, 113, 160 can make intelligent decisions for applying different policies for each individual incoming paging message and in this way help the radio network node 110, 113, 160 especially during peak traffic or congestion to resolve the problems. This might be performed by e.g. delaying certain low priority paging messages by using multiples of default paging cycles as the paging cycle for those paging messages, ignore or discard certain low priority paging messages, and/or internally use a lower priority for certain paging messages in relation to user data and in this way decrease the impact of high paging load on the user data rates.

In a normal traffic scenario the present solution provides a means for prioritizing between certain high priority user data and low priority paging messages.

According to some embodiments, the page request may be filtered in the base station 110 such an eNodeB.

In these embodiments the eNodeB reduces its own congestion by not forwarding all pages to the radio interface. T the eNodeB uses a priority indicator with each page message over the S1 interface.

According to some embodiments, the priority is applied at RRC connection setup

In these embodiments the eNodeB applies prioritization/congestion control when it receives the RRC connection request with indicated cause from the user equipment 120. This solution uses a cause value is delivered with the RRC/S1 page message to the user equipment 120 so that the user equipment 120 can use an appropriate establishment cause in the RRC connection request. The benefits with this solution is that the prioritization for Mobile Terminated (MT) sessions is performed just before the actual RRC resources are allocated and at the same place as the prioritization for other sessions. This leads an efficient resource usage and alignment with other congestion control mechanisms.

When using the word "comprise" or "comprising" it shall be interpreted as non-limiting, i.e. meaning "consist at least of".

The present invention is not limited to the above described preferred embodiments. Various alternatives, modifications and equivalents may be used. Therefore, the above embodiments should not be taken as limiting the scope of the invention, which is defined by the appending claims.

The invention claimed is:

1. A method implemented in an eNodeB in a Long Term Evolution (LTE) communication system for handling a paging procedure to a first user equipment, the method comprising:
   receiving a paging message from a Mobility Management Entity, the paging message comprising an indication that indicates a priority of said paging message and a type of downlink data to be transmitted to the first user equipment, the first user equipment being in idle mode;
   obtaining the indication from said paging message and determining a paging policy based on the obtained indication of type of downlink data to be transmitted to the first user equipment, which paging policy is the indicated priority of said paging message;
   obtaining further indications from the mobility management entity, which respective further indications each indicate a type of downlink data to be transmitted to one or more second user equipments; and
   performing the paging procedure of said first user equipment by sending a paging message to the first user equipment according to the determined paging policy, said paging message notifying the first user equipment that there is downlink data to be transmitted to the first user equipment;
   wherein determining the paging policy further comprises determining a respective paging policy based on each of the obtained respective further indications of type of downlink data to be transmitted to the one or more second user equipments; and
   wherein sending the paging message comprises sending the paging message to the first user equipment according to the determined paging policy, said determined paging policy being prioritized towards sending paging messages to the one or more second user equipments taking into consideration the different determined paging policies for the data to be sent to the one or more second user equipments.

2. The method according to claim 1, wherein:
   the eNodeB comprises a table of different downlink data types and different paging policies, in which table each downlink data type is associated with a respective specific paging policy; and
   determining the paging policy comprises using the table for mapping the indicated downlink data type to the paging policy to be used.

3. The method according to claim 1, wherein the indicated type of downlink data to be transmitted to the first user equipment is represented by a quality of service requirement of said downlink data to be transmitted to the first user equipment.

4. The method according to claim 1, further comprising prioritizing a paging policy list such that a lower paging transmission intensity shall be used for lower quality of service requirements.

5. The method according to claim 1, wherein the obtained indication is represented by a Quality of Service Class Indicator referred to as QCI.

6. The method according to claim 1, wherein the obtained indication is represented by a service type parameter.

7. An eNodeB in a Long Term Evolution (LTE) communication system, for handling a paging procedure to a first user equipment, the eNodeB comprising:
   a transmitter; and
   a processing circuit configured to receive a paging message from a Mobility Management Entity, the paging message comprising an indication that indicates a priority of said paging message and a type of downlink data to be transmitted to the first user equipment, the first user equipment being in idle mode;
   wherein the processing circuit is further configured to obtain the indication from said paging message and to determine a paging policy based on the obtained indication of type of downlink data to be transmitted to the first user equipment, which paging policy is the indicated priority of said paging message, the processing circuit further configured to obtain further indications from the mobility management entity, which respective further indications each indicate a type of downlink data to be transmitted to one or more second user equipments and to determine a respective paging policy based on each of the obtained respective further indications of type of downlink data to be transmitted to the one or more second user equipments; and
   wherein the transmitter is configured to perform the paging procedure of said first user equipment by sending a paging message to the first user equipment according to the determined paging policy, said paging message notifying the first user equipment that there is downlink data to be transmitted to the first user equipment; and wherein the transmitter is further configured to send the paging message to the first user equipment according to the determined paging policy, said determined paging policy being prioritized towards sending paging messages to the one or more second user equipments taking into consideration the different determined paging policies for the data to be sent to the one or more second user equipment.

8. The eNodeB according to claim 7, further comprising:

a table of different downlink data types and different paging policies, in which table each downlink data type is associated with a respective specific paging policy; and the processing circuit is further configured to determine the paging policy by using the table to map the indicated downlink data type to the paging policy to be used.

9. The eNodeB according to claim 7, wherein the indicated type of downlink data to be transmitted to the first user equipment is represented by a quality of service requirement of said downlink data to be transmitted to the first user equipment.

10. The eNodeB according to claim 7, wherein a paging policy list is prioritized such that a lower paging transmission intensity shall be decided to be used for lower quality of service requirements.

11. The eNodeB according to claim 7, wherein the obtained indication is represented by a Quality of Service Class Indicator referred to as QCI.

12. The eNodeB according to claim 7, wherein the obtained indication is represented by a service type parameter.

* * * * *